United States Patent
Morel et al.

(10) Patent No.: US 10,348,483 B2
(45) Date of Patent: Jul. 9, 2019

(54) METHOD FOR EXECUTING A CRYPTOGRAPHIC CALCULATION AND APPLICATION TO THE CLASSIFICATION BY SUPPORT VECTOR MACHINES

(71) Applicant: SAFRAN IDENTITY & SECURITY, Issy-les-Moulineaux (FR)

(72) Inventors: Constance Morel, Issy les Moulineaux (FR); Julien Bringer, Issy les Moulineaux (FR); Herve Chabanne, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 219 days.

(21) Appl. No.: 15/418,314

(22) Filed: Jan. 27, 2017

(65) Prior Publication Data
US 2017/0222797 A1   Aug. 3, 2017

(30) Foreign Application Priority Data
Jan. 28, 2016  (FR) ...................... 16 50693

(51) Int. Cl.
*G06F 11/30*  (2006.01)
*G06F 12/14*  (2006.01)
(Continued)

(52) U.S. Cl.
CPC ............... *H04L 9/06* (2013.01); *G06F 21/72* (2013.01); *H04L 9/00* (2013.01); *H04L 2209/46* (2013.01); *H04L 2209/50* (2013.01)

(58) Field of Classification Search
CPC ......... H04L 9/06; H04L 9/00; H04L 2209/46; H04L 2209/04; H04L 2209/50; G06F 21/72; G06K 9/6267; G06K 9/6269
See application file for complete search history.

(56) References Cited

U.S. PATENT DOCUMENTS

2007/0081664 A1 * 4/2007 Avidan .................. H04L 9/3093
                                                                380/28
2015/0295925 A1 * 10/2015 Patey .................... H04L 9/3231
                                                                713/186

OTHER PUBLICATIONS

Search Report and Written Opinion in French Application No. 1650693 dated Nov. 16, 2016, with English translation coversheet, 11 pages.

(Continued)

*Primary Examiner* — Trong H Nguyen
(74) *Attorney, Agent, or Firm* — Womble Bond Dickinson (US) LLP (57) ABSTRACT

A method for calculating a function as a sub-function $f_X$ of a datum of a client, a sub-function $f_Y$ of a datum, and a product of n indexed sub-functions $f_i$ of both data by randomly generating, n indexed invertible data $r_i$ from the set $\mathbb{Z}_m$ with m being a prime number, generating, for each i from 1 to n, a set for which each element is formed by a product of a datum $r_i$ with a possible result of the sub-function of two variables $f_i$ evaluated in both data, applying an oblivious transfer protocol between the client and a server so that the client recovers, for each i an intermediate datum $t_i$ equal to: $t_i = r_i \times f_i(x_i, Y)$, obtaining, by the client a result T from intermediate data such that: $T = f_X(X') \times \Pi_{i=1}^{n} t_i$, obtaining, by the server a result R from inverted data such that: $R = f_Y(Y) \times \Pi_{i=1}^{n} r_i^{-1}$ using the results in a cryptographic application.

14 Claims, 4 Drawing Sheets

(51) Int. Cl.
 *H04L 9/06* (2006.01)
 *G06F 21/72* (2013.01)
 *H04L 9/00* (2006.01)

(56) References Cited

OTHER PUBLICATIONS

Pathak. "Privacy Preserving Techniques for Speech Processing." Dec. 1, 2010. Retrieved from http://www.cs.cmu.edu/~manasp/proposal.pdf. pp. 1-54.
Laur et al. "Crytopgraphically private support vector machines." Proceedings of the 12th ACM SIGKDD Int. Conference on Knowledge Discovery and Data Mining. Aug. 20-23, 2006, Philadelphia, PA. pp. 618-624.
Lin et al. "On the Design and Analysis of Privacy-Preserving SVM Classifier." IEEE Transactions on Knowledge and Data Engineering, vol. 23, No. 11. Nov. 1, 2011. pp. 1704-1717.

\* cited by examiner

METHOD FOR EXECUTING A CRYPTOGRAPHIC CALCULATION AND APPLICATION TO THE CLASSIFICATION BY SUPPORT VECTOR MACHINES

FIELD OF THE INVENTION

The invention relates to a method for performing a cryptographic calculation applied together between two processing units, wherein a function of two variables is evaluated by two parties, having as inputs, data respectively held by each party, without a party learning information on the data held by the other party.

The invention notably applies to the secured classification according to a classifier of a support vector machine, the classifier of which uses a kernel of the radial base function type.

STATE OF THE ART

A technique for classifying data according to a classifier of a support vector machine (SVM) is already known. This technique consists of classifying an input datum x by evaluating a function called a classifier H at the datum x, and by comparing the result of H(x) to a threshold.

For example, in the case of a classification between two classes noted as 1 and −1, H(x) is compared with a threshold b and if H(x) is less than b, x is determined as belonging to the class 1 and if H(x) is greater than b, x is determined as belonging to the class −1.

The threshold b may be reduced to 0 by replacing H(x) by an H' such that H'(x)=sign(H(x)−b).

The definition of the classifier of course depends on the definition of the classes. In order to simplify its calculation, the classifier may be written with a predefined kernel function.

A first example of a kernel function, a function with a radial basis (or RBF for Radial Basis Function), which is a function with real values, the value of which only depends on the distance of the datum x to a datum Y which is a parameter of the classifier.

For example, a kernel function with a radial basis may be a Gaussian kernel of the form $\alpha e^{-\gamma \|x-Y\|_2^2}$. The classifier H(x) is then written as:

$$\sum_{k=1}^{M} h_k(x) = \sum_{k=1}^{M} \alpha_k e^{-\gamma_k \|x-Y_k\|_2^2}$$

Another example of a kernel function is a hyperbolic tangent kernel of the form tan h $$(\kappa \langle x | Y \rangle + C) = \frac{\exp(2(\kappa \langle x | Y \rangle + C)) - 1}{\exp(2(\kappa \langle x | Y \rangle + C)) + 1}.$$

The classifier H(x) is then written as:

$$\sum_{k=1}^{M} h_k(x) = \sum_{k=1}^{M} \tanh(\kappa_k \langle x | Y_k \rangle + C_k)$$

In certain contexts, it may be advantageous to apply a classification of data in a secured way, i.e. so that the portion which holds the datum to be classified does not learn any information on the parameters of the classifier, and the portion which knows the parameters of the classifier do not learn any information on the datum to be classified.

This may be the case for protecting the confidentiality of the data to be classified, for example.

Secured data classification methods according to an SVM classifier with a kernel function have already been proposed. These methods are based on the implementation of multi-party secured calculation methods, i.e. methods where several parties are involved in the calculation, and at the end of the method, a party holds the result of the classification, and no party has obtained any information on the data held by the other parties.

The main difficulty which is then posed, for certain kernels like the Gaussian kernel with a radial basis or the hyperbolic tangent kernel, is the secured calculation of an exponential, appearing in the examples of kernel functions shown herein before. Indeed, the calculation of an exponentiation is a complex operation to apply in multiparty secured computation protocols.

To find a remedy to this, the article of Lin et al., "On the design and analysis of the privacy-preserving SVM classifier", *IEEE Trans. Knowl. Data Eng.*, 23(11): 1704-1717, 2011 is for example known, a method in which an exponential is calculated by means of a Taylor expansion.

Another solution, notably shown in the following articles:

S. Avidan et al., "Privacy preserving pattern classification", In *Proceedings of the International Conference on Image Processing, ICIP* 2008, Oct. 12-15, 2008, San Diego, Calif., USA, pages 1684-1687, 2008, M. Upmanyu et al., "a secure crypto-biometric verification protocol", *IEEE Transactions on Information Forensics and Security*, 5(2): 255-268, 2010, Y. Rahulamathavan et al., "Privacy-preserving clinical decision support system using gaussian kernel-based classification", *IEEE J. Biomedical and Health Informatics*, 18(1): 56-66, 2014 proposes, in order to obtain the result of a $e^{f(x,y)}$ function, calculation by a multiparty secured calculation f(x,y)+r with r being a random element selected by a party, and f(x,y)+r being the result obtained by the other party, so that no party has the result f(x,y). Then the party having obtained f(x,y)+r calculates $e^{f(x,y)+r}$ and the other party calculates $e^r$, and the parties share the result so that one of them obtains $e^{f(x,y)+r}/e^r$.

This method has the drawback of not being completely secured since it is not possible to randomly select r, distributed uniformly in an infinite space and it is possible to infer from the information on the value of f(x,y). For example, by noting $T=[T_{min}, T_{max}]$ the space in which r is selected, then if $f(x,y)+r>T_{max}$, it may be inferred therefrom that f(x,y) is greater than $f(x,y)+r-T_{max}$.

A solution for securing this method may be to calculate f(x,y)+r modulo T, i.e. ((f(x,y)+r)mod T)=f(x,y)+r+k× $(T_{max}-T_{min})$ with k∈ℤ such that $T_{min} \le f(x,y)+r+k\times(T_{max}-T_{min}) \le T_{max}$. In this case, ((f(x,y)+r)mod T) would be randomly uniformly distributed in the space T and therefore no information on f(x,y) would be able to be inferred therefrom. However, the method becomes non-exact and does not always return a correct result since $e^{f(x,y)}$ is not always equal to $e^{(f(x,y)+r) \bmod T}/e^r$.

PRESENTATION OF THE INVENTION

A goal of the invention is to propose a method allowing classification of a datum in a secured way with a support vector machine, for which the evaluation of the kernel may comprise exponentiation.

In this respect, the object of the invention is a method for executing a cryptographic calculation applied by a first processing unit, a so-called client unit having a first datum comprising a number n of indexed components and a second processing unit, a so-called server unit, having at least one second datum, the units each comprising processing means, the method comprising a secured evaluation of a function of two variables being written as a product of:
   a sub-function $f_X$ of a first variable
   a sub-function $f_Y$ of a second variable, and
   a product of n indexed sub-functions $f_i$ of both variables,
the evaluation being applied with the first and the second datum as inputs of the function,
the method being characterized in that it comprises the following steps:
   randomly generating, by the server unit, a set of n reversible data for the multiplication, indexed $r_i$ belonging to the set $\mathbb{Z}_m$ with m being a prime number,
   generating, by the server unit, for each i from 1 to n, a set for which each element is formed by the product of an indexed datum $r_i$ with a possible result of the sub-function of two variables $f_i$ evaluated at the first and the second datum,
   applying an oblivious transfer protocol between the client unit and the server unit so that the client unit recovers, for each i from 1 to n, an intermediate datum $t_i$ equal to the result of the sub-function of both variables $f_i$ evaluated at the first and the second data, multiplied by the indexed datum $r_i$:

$$t_i = r_i \times f_i(x_i, Y)$$

multiplying, by the client unit, all the intermediate data and the sub-function of the first variable $f_X$ evaluated in the first datum in order to obtain a result T:

$$T = f_X(X') \times \prod_{i=1}^{n} t_i$$

generating, by the server unit, a result R equal to the product of all the reciprocals of the indexed data and of the sub-function of the second variable $f_Y$ evaluated in the second datum:

$$R = f_Y(Y) \times \prod_{i=1}^{n} r_i^{-1}$$

using the results T and R in a cryptographic application.
Advantageously, but optionally, the method according to the invention may further comprise one of the following features:
   the method may further comprise a step during which the client unit communicates the result T to the server unit, and the server unit calculates the result of the function by multiplying the result T with the result R.
   the method may further comprise a step during which the server unit communicates the result R to the client unit, and the client unit calculates the result of the function by multiplying the result T with the result R.
   the server unit may have a number N of data $Y_1, \ldots Y_N$, and the datum held by the client unit is expressed in base q, wherein q is a positive integer strictly greater than 1, the components of the data being with values between 0 and q−1, and the method then comprises the evaluation of the function between the datum of the client unit and respectively each datum of the server unit, and
   during step a), the server unit randomly generates a number N·n of indexed invertible data $r_{i,j}$,
   during step b), the server unit generates:
      either, for each datum $Y_j$ which it has, and for each i from 1 to n, a q-uplet for which each element is formed by the product of an indexed datum $r_{i,j}$ with a possible result of the sub-function of two variables $f_i$ evaluated at the first and the second datum:

$$(r_{i,j} \times f_i(0, Y_j), \ldots, r_{i,j} \times f_i(q-1, Y_j))$$

or, for each i from 1 to n, a q-uplet for which each element is the concatenation of the results of the product of an indexed datum with the evaluation of the sub-function of two variables $f_i$ at an integer element comprised between 0 and q−1 and each of the N data of the server unit:

$$(r_{i,1} \times f_i(0, Y_1) \| \ldots \| r_{i,N} \times f_i(0, Y_N), \ldots, r_{i,1} \times f_i(q-1, Y_1) \| \ldots \| r_{i,N} \times f_i(q-1, Y_N)).$$

during step c), the client unit respectively applies:
      either a number N·n of oblivious transfers of type 1 from among q with the inputs of the server unit coded on m bits,
      or a number n of oblivious transfers of type 1 from among q with the inputs of the server unit coded on N·m bits.
   the data of the client unit and of the server unit may be data representative of physical objects or of physical quantities obtained from a sensor or from an interface.
   the function may be at least one portion of a kernel of a support vector machine.

The object of the invention is also a computer program product, comprising code instructions for executing, by a processor of a processing unit, a method comprising the application of steps for:
   randomly generating a set of n invertible data for the multiplication, indexed $r_i$ belonging to the set $\mathbb{Z}_m$ with m being a prime number,
   generating, for each i from 1 to n, a set for which each element is formed by the product of an indexed datum $r_i$ with a possible result of a function of two variables $f_i$ evaluated in an unknown datum and a known datum,
   participating in an oblivious transfer protocol with a distinct processing unit for communicating, for each i from 1 to n, an element from among the generated elements.

The object of the invention is also a method for classifying a datum held by a client unit by evaluating a classifier H of a support vector machine in said datum applied together between the client unit and a server unit having parameters of the classifier H, characterized in that it comprises:
   the evaluation of at least one portion of the kernel of the classifier in the datum held by the client unit applied according to the method in accordance with one of the preceding methods, and
   the evaluation of the classifier in the datum held by the client unit from the evaluation, by multiparty secured calculation between the client unit and the server unit.
Advantageously, but optionally, the classification method according to the invention may further comprise at least one of the following features:
   the method may comprise a preliminary step for quantifying the datum held by the client unit, and the step for evaluating at least one portion of the kernel of the classifier may be applied on an entire quantification of the kernel of the classifier.

the step for evaluating the kernel of the classifier may be applied on an entire quantification of the kernel of the classifier multiplied by a scale factor.

the kernel of the classifier may be a kernel with a Gaussian radial basis h of the form:

$$h(X,Y) = \alpha e^{-\gamma \|X-Y\|_2^2}$$

and the datum (X) held by the client unit comprises K floating components $(X_1, \ldots X_K)$, and the method then comprises the steps for:

generating (100), from the datum (X) held by the client unit, a datum $(X' = (x_1, \ldots x_{n+p}))$ in base q, and for which:

the first n components correspond to the quantification of the K components of the datum (X), and verify:

$$X_i \approx \sum_{j=1}^{\ell} q^{j-1} x_{(i-1)\ell+j}$$

wherein n=K*l, $X_i$ is a component of the datum (X) and $x_i$ is a component of the binary datum (X'), the n+1$^{th}$ to n+p$^{th}$ components corresponding to the quantification of the quadratic norm of the datum (X), $\|X\|_2^2$, such that:

$$\|X\|_2^2 \approx \sum_{i=1}^{p} q^{i-1} x_{n+i}$$

evaluating (200) the classifier kernel, by calculating a function F which is written as the product of:

a sub-function $f_X$ of the datum X' of the client unit such that $f_X(X)=1$ a sub-function $f_Y$ of a second datum Y held by the server unit such that $f_Y(Y) = \alpha e^{-\gamma \|Y\|_2^2}$ a product of n indexed sub-functions $f_i$ of two variables, such that:

$$\forall (i,j) \in [1, K] \times [1, l], f_{(i-1)l+j}(x_{(i-1)l+j}, Y) = \text{quant}\left(ae^{\gamma 2^j x_{(i-1)l+j} Y_i}\right)$$

$$\forall i \in [1, p], f_{Kl+i}(x_{Kl+i}, Y) = \text{quant}\left(ae^{\gamma 2^{i-1} x_{Kl+i}}\right)$$

wherein quant is an entire quantification function and a is a scale factor greater than or equal to 1.

the kernel of the classifier may be a hyperbolic tangent kernel h of the form:

$$h(X,Y) = \tan h(\kappa \langle X | Y \rangle + C)$$

and the datum held by the client unit comprises K floating components $(X_1, \ldots X_K)$, the method then comprising the steps for:

generating (100), from the datum (X) held by the client unit, a datum (X') in base q, for which the components correspond to the quantification of the K components of the datum (X), and verify:

$$X_i \approx \sum_{j=1}^{l} q^{j-1} x_{(i-1)l+j}$$

wherein n=K*l, $X_i$ is a component of the datum (X) and $x_i$ is a component of the datum in base q (X'), evaluating (200) a portion of the classifier kernel of the form $\exp(2(\kappa < X|Y > + C))$, by calculating a function F written as the product of:

a sub-function $f_X$ of the datum (X') in base q of the client unit such that $f_X(X')=1$ a sub-function $f_Y$ of a second datum (Y) held by the server unit such that $f_Y(Y) = e^{2C}$ a product of n indexed sub-functions $f_i$ of two variables, such that:

$$\forall (i,j) \in [1, K] \times [1, l], f_{(i-1)l+j}(x_{(i-1)l+j}, Y) = \text{quant}(\alpha \cdot e^{\kappa 2^j x_{(i-1)l+j} Y_i})$$

wherein quant is an entire quantification function and a is a scale factor greater than or equal to 1.

The object of the invention is also a data processing system comprising a first processing unit and a second processing unit, each processing unit comprising a processor and a communication interface, the system being characterized in that the first and the second processing units are adapted for applying the method for executing a cryptographic calculation or the classification method according to the foregoing description.

The method proposed gives the possibility of calculating in a secured way between two parties a function written as a product of sub-functions of two variables and of two functions of one variable (optionally constants).

From among the functions which may be evaluated by means of this method, appear kernel functions of support vector machines such as a Gaussian kernel, a hyperbolic tangent kernel, which are written as a product of exponentials.

The method gives the possibility of simply evaluating such a function by breaking it down into elementary exponential components only depending on a single bit of the datum to be classified.

Further, this method does not allow any information on the argument of the exponential to leak out and is therefore secured.

DESCRIPTION OF THE FIGURES

Other features, objects and advantages of the present invention will become apparent upon reading the detailed description which follows, with reference to the appended figures, given as non-limiting examples and wherein.

DETAILED DESCRIPTION OF AT LEAST ONE EMBODIMENT OF THE INVENTION

Data Processing System

Figure 1:
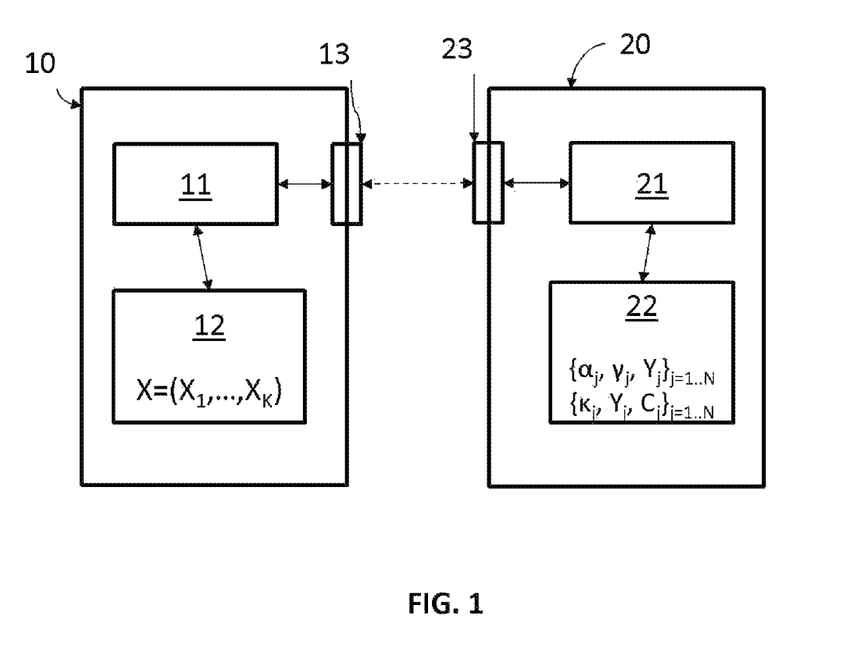
FIG. 1 schematically illustrates an example of a data processing system.

With reference to FIG. 1, two processing units 10, 20 are illustrated respectively comprising a client unit 10 and a server unit 20. Each processing unit comprises processing means, for example a processor 11, 21 adapted for applying calculations or operations on data, and for executing a program comprising code instructions installed on the processor. Each processing unit also comprises a memory 12, 22, and a communication interface 13, 23 with the other portion.

The client unit 10 has a datum X comprising a number K of components $X_i$, wherein K is a positive integer and i is a mute index with values from 1 to K, $X=(X_1, \ldots, X_K)$. The datum X is advantageously a datum to be classified. The datum X may be representative of an object or of a physical quantity. It may be obtained from a sensor or an interface. As a non-limiting example, the datum X may be a digital acquisition of a biometric feature of an individual. The classification of the datum consists of verifying whether the datum corresponds to an acquisition carried out on a living tissue or not, in which case a fraud may be detected.

The classification of the datum X is then applied by means of a support vector machine comprising a classifier H using a kernel function, which may comprise an exponential.

The server unit 20 in this case has the parameters of the classifier H. For example, in the case when the classifier kernel h is a Gaussian kernel with a radial basis of the form $$h(x) = \alpha e^{-\gamma \|X-Y\|_2^2},$$

the classifier is written as:

$$H(X) = \sum_{j=1}^{N} h_j(X) = \sum_{j=1}^{N} a_j e^{-\gamma_j \|X-Y_j\|_2^2}$$

Wherein N is a positive prime number, j is a mute index with values from 1 to N, and $\alpha_j$, $\gamma_j$, and $Y_j$ are parameters of the classifier.

The server unit 20 has the parameters $\alpha_j$, $\gamma_j$, and $Y_j$, for j from 1 to N.

According to another example, the kernel h of the classifier may be a hyperbolic tangent kernel of formula $h(x) = \tan h(\kappa \langle x | Y \rangle + C)$, the classifier is written as:

$$H(X) = \sum_{j=1}^{N} h_j(X) = \sum_{j=1}^{N} \tanh(\kappa_j \langle X | Y_j \rangle + C_j)$$

Wherein $\kappa_j$, $Y_j$ and $C_j$ are the parameters of the classifier. The server unit 20 then has the parameters $\kappa_j$, $Y_j$ and $C_j$, for any j from 1 to N.

Other classifier kernels exist, for example a homogeneous or inhomogeneous polynomial kernel.

Method for Classifying Data

Figure 2A:
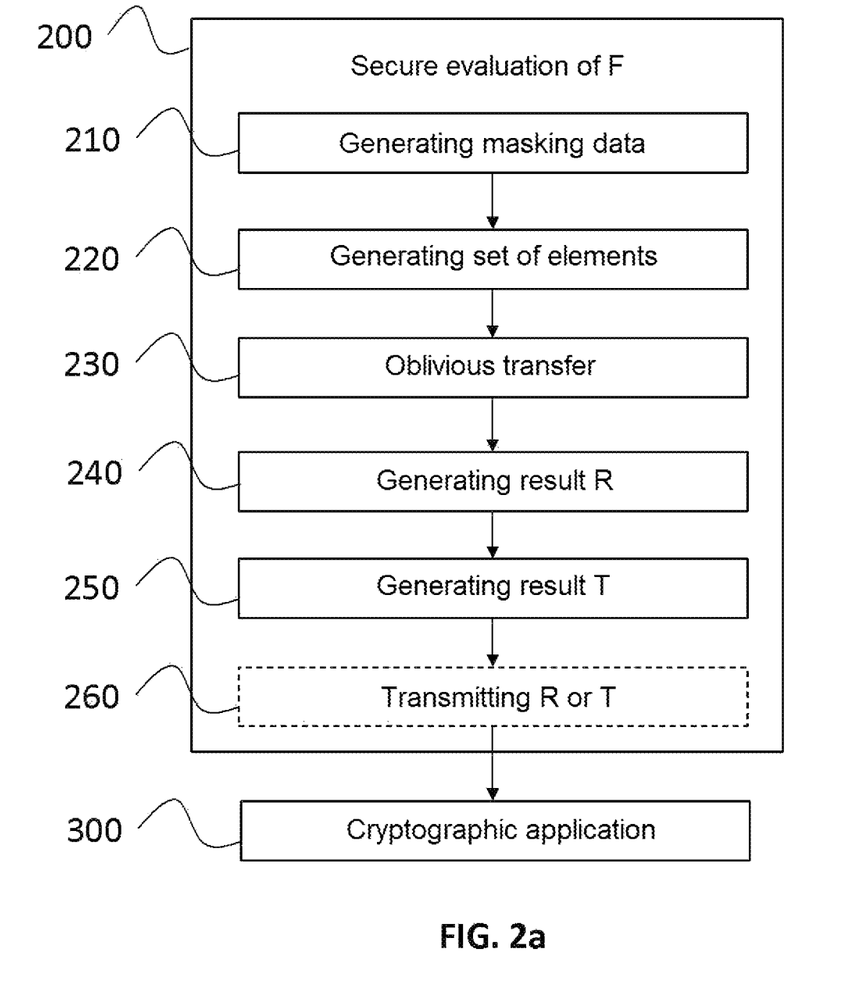
FIG. 2a schematically illustrates the main steps of an example of a method for performing a cryptographic calculation comprising a secured evaluation of a function.
Figure 2B:
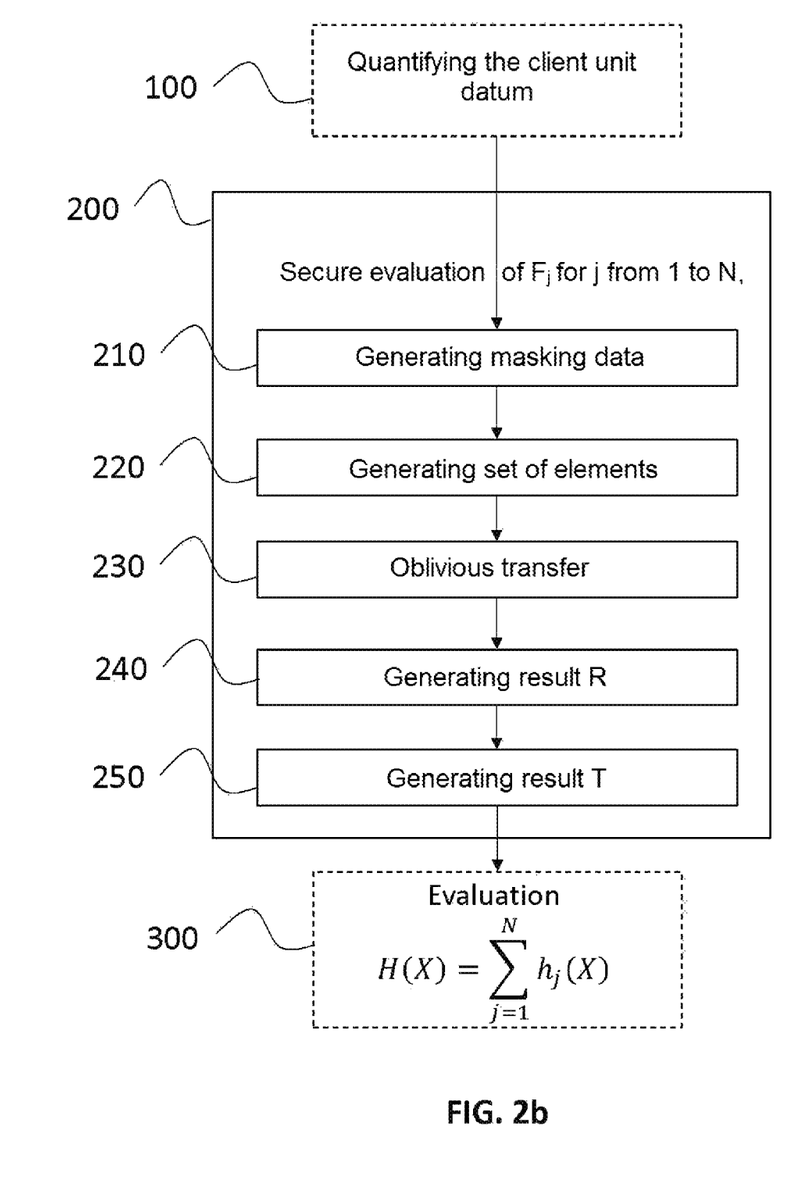
FIG. 2b schematically illustrates the main steps of an example of a classification method.

With reference to FIG. 2b, the processing units 10, 20 may be engaged into a method for classifying the datum X held by the client unit 10.

In the case when the components of the datum X held by the client unit are floating numbers, i.e. numbers with points, the method advantageously includes a first step 100 consisting of reducing the datum held by the client unit 10 to a datum expressed in base q, i.e. for which all the components are with integer values comprised between 0 and q−1, wherein q is an integer strictly greater than 1.

For example, this step 100 may be a binarization step of the datum held by the client unit, in the case when q=2.

This step comprises the approximation of the datum X with a datum X', for which the components $X'_i$ are integers, in order to be able to then apply with the quantified datum a secured calculation. Indeed, the multiparty secured calculation protocols (or SMC) are protocols which apply to integers and not to floating numbers. In this respect, it was demonstrated (for example in the articles mentioned earlier) that the degradation of the performances due to quantification is very small.

The datum X' is further rewritten in base q in order to obtain a vector for which the components $x_i$ are with integer values comprised between 0 and q−1. This is noted as:

$$X_i \approx X'_i = \sum_{j=1}^{l} q^{j-1} x_{(i-1)l+j}$$

Wherein $(x_1, \ldots, x_n)$ are q-ary components i.e. with a value in the interval $\{0, \ldots, q-1\}$, and wherein n=K*l, n is the number of components of the datum rewritten in base q, l is a positive integer, and j is a mute index with values from 1 to l. The datum of the client unit is therefore approximated as $X' = (x_1, \ldots, x_n) \in \{0, \ldots, q-1\}^n$.

In a particular case, the datum X' is a binary datum for which the components are with values in $\{0,1\}$.

In a particular embodiment wherein the kernel of the classifier is Gaussian, as this will be seen hereafter, the client unit will also need, for evaluating the kernel in its datum X, of evaluating the squared quadratic norm of its datum $\|X\|_2^2$. Therefore, the quantification step 100 also comprises a quantification of this quadratic norm, followed by a conversion of the norm into a datum expressed in basis q, by the generation of p q-ary components $x_i$ such that:

$$\|X\|_2^2 \approx \sum_{i=1}^{p} q^{i-1} x_{n+i}$$

Wherein p is a positive integer, and i is a mute index with values from 1 to p.

According to this embodiment, in the subsequent method, the input of the client will then be a datum $X' = (x_1, \ldots, x_{n+p}) \in \{0, \ldots, q-1\}^{n+p}$. In the case when the datum X is binarized, its quadratic norm is also binarized.

Secured Function Evaluation

Figure 3:
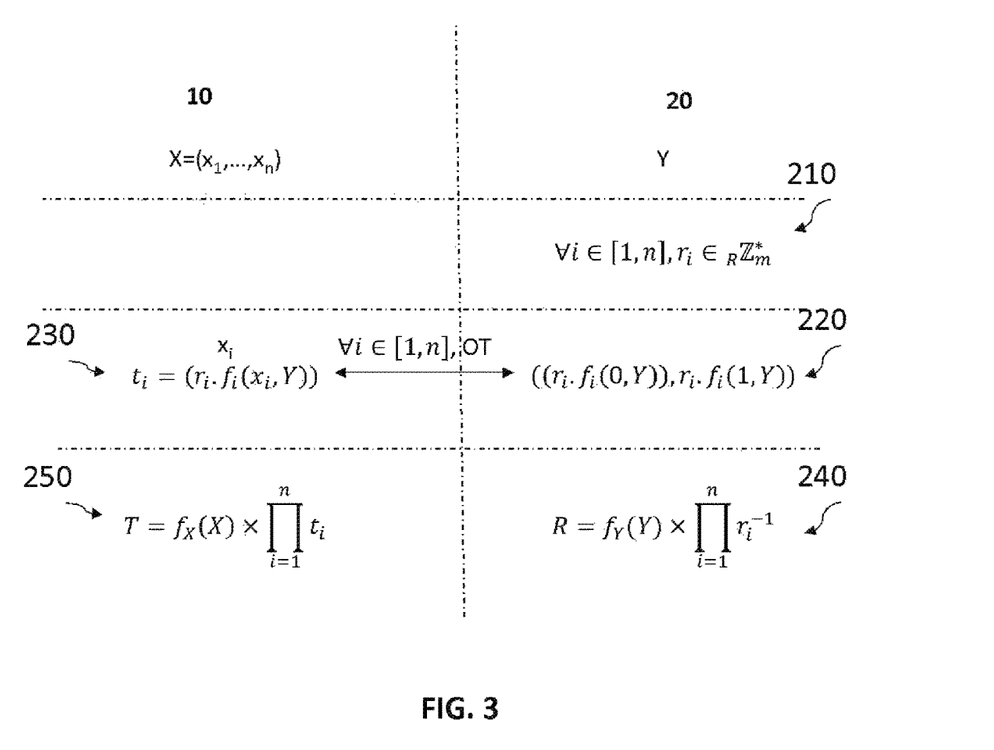
FIG. 3 schematically illustrates an exemplary application of a phase for secured evaluation of a function.

With reference to FIGS. 2a, 2b and 3, the client unit and the server unit may then be engaged in a multiparty secured calculation method 200 of a function F of two variables X, Y, generally written as the product:

- of a sub-function of a first variable $f_X(X)$,
- of a sub-function of a second variable $f_Y(Y)$, and
- of the product of n sub-functions of two variables $f_i(x_i, Y)$,
  wherein n is the number of components $x_i$ of the datum X of the client unit, i.e. a positive integer, and i is a mute index with values from 1 to n.

The datum X of the client unit is a datum expressed in base-q (if necessary via the application of step 100), for which the components are with integer values comprised between 0 and q−1. In a particular case, the datum X is binary, i.e. for which the components are with values equal to 0 or 1.

Therefore it is noted that:

$$F(X, Y) = f_X(X) \times f_Y(Y) \times \prod_{i=1}^{n} f_i(x_i, Y)$$

For applying step 200, all the calculations are carried out in the set $\mathbb{Z}_m$ of the integers comprised between 0 and m−1, with m being a positive integer prime number. In this respect, the value of m is adapted according to the function F, so that the space $\mathbb{Z}_m$ contains all the possible results of function F. For the safety of the protocol, the latter is also restricted to the functions $f_i$ and to the inputs X,Y such that $f_i(x_i,Y)$ is never zero.

In the context of a method for classifying data, the function F is the kernel function $h_j$ of the support vector machine or a portion of the latter, optionally multiplied by a scale factor a as explained hereafter, and quantified. The kernels $h_j$ are therefore all calculated for j from 1 to N.

The method discussed below is however not limited to classification applications and therefore to kernel functions of a support vector machine.

FIG. 3 illustrates an example of application of step 200 for a general case when the server unit has a datum Y, the client unit has the datum X, and the data are engaged in the calculation of F(X,Y).

Alternatively, the server unit may have a set of N data $(Y_1, \ldots, Y_N)$, and the method may have the purpose of calculating the evaluation of the function at the datum of the client unit and each datum of the server unit, i.e. all the $F(X,Y_j)$ with j comprised between 1 and N. This is notably the case in the application to a support vector machine classifier of the form:

$$H(X) = \sum_{j=1}^{N} h_j(X) = \sum_{j=1}^{N} F(X, Y_j)$$

The method 200 comprises a first step 210 during which the server unit randomly generates a set of masking data $r_i$, indexed, reversible for multiplication in the set $\mathbb{Z}_m$. The fact that m is a prime number gives the possibility that all the non-zero elements of $\mathbb{Z}_m$ are invertible. Thus the $r_i$ are selected in $\mathbb{Z}_m^*$.

In the case when the server unit has many data $Y_j$, it randomly generates as many sets of data $r_{i,j}$ than that it has as data.

The method 200 then comprises a step 220 during which the server unit generates, from these data $r_i$, and for all i from 1 to n, a set of elements such that each element is a possible result of the function $f_i$ evaluated at the datum of the client unit, which is therefore unknown to it, and the datum of the server unit, multiplied by a datum $r_i$.

Thus when the server unit has only one single binary datum, the set of elements generated for each i is the doublet:

$(r_i \times f_i(0,Y), r_i \times f_i(1,Y))$.

When the server unit has only a single q-ary datum, the set of elements is a q-uplet:

$(r_i \times f_i(0,Y), \ldots, r_i \times f_i(q-1,Y))$.

When the server unit has N data, two cases are possible. It may repeat the step 220 N times, i.e. it generates for each datum j from 1 to N, and for each i from 1 to n, a q-uplet (which may be a doublet if q=2):

$(r_{i,j} \times f_i(0,Y_j), \ldots, r_{i,j} \times f_i(q-1,Y_j))$.

n*N doublets are thereby obtained.

Alternatively, the server unit may only generate n q-uplets, i.e. one q-uplet per component of the datum of the client unit. In this case, each element of each q-uplet is the concatenation of the results of the product of an indexed datum $r_i$ with the evaluation of the sub-function of two variables $f_i$ in an element a from among the set of integers from 0 to q−1, and in each of the N data $Y_j$ of the server unit:

$r_{i,1} \times f_i(\alpha,Y_1) \| \ldots \| r_{i,N} \times f_i(\alpha,Y_N)$,

Each of the n doublets is therefore written as, for i from 1 to n, $(r_{i,1} \times f_i(0,Y_1) \| \ldots \| r_{i,N} \times f_i(0,Y_N), \ldots, r_{i,1} \times f_i(q-1,Y_1) \| \ldots \| r_{i,N} \times f_i(q-1,Y_N))$.

The method then comprises a step 230 during which the client unit and the server unit are engaged in an oblivious transfer protocol, and wherein the client recovers, for each i from 1 to n, one of the elements generated by the server in step 120 depending on the value of $x_i$. Thus, in the case when the server unit only has one single datum, the client unit recovers for any i from 1 to n, the indexed element of the q-uplet by the value of $x_i$. In the binary case: if $x_i$=0, it recovers the first element, and if $x_i$=1, it recovers the second element.

In this way, the client unit recovers an intermediate datum $t_i$ such that:

$t_i = r_i \times f_i(x_i, Y)$.

In the case when the server unit comprises several data $Y_j$, the application of the oblivious transfer protocol depends on the application of the previous step 120.

In the first of both discussed cases herein before, the client unit has to apply a number n*N of oblivious transfers of the type 1 from among q with inputs of the server unit on m bits for recovering the intermediate data for all the doublets. In the second case, it only achieves n oblivious transfers of type 1 from among q, with inputs of the server unit on m·N bits.

The oblivious transfers are of type 1 from among 2 in the case when the datum of the client unit is binary.

For applying an oblivious transfer of type 1 from among q, reference may be made to the following publications:

M. Naor and B. Pinkas, "Computationally secure oblivious transfer". J. Cryptology, 18(1):1-35, 2005, V. Kolesnikov and R. Kumaresan, "Improved OT extension for transferring short secrets", in Advances in Cryptology—Crypto 2013—33$^{rd}$ Annual Cryptology Conference, Santa Barbara, Calif., USA, Aug. 18-22, 2013, Proceedings, Part II, pages 54-70, 2013.

In both cases, the oblivious transfer protocol used is advantageously of the type shown in protocol 52, section 5.3 of the publication of G. Asharov et al., "More efficient Oblivious Transfer and Extensions for Faster Secure Computation", In 2013 *ACM SIGSAC Conference on Computer and Communications Security, CCS'13*, Berlin, Germany, Nov. 4-8, 2013, pages 535-548, 2013.

This protocol gives the possibility of extending κ oblivious transfers on κ bit inputs (wherein κ is a safety parameter often equal to 80 or 128), in n oblivious transfers on l bits, with n>κ and l>κ, by only using efficient symmetrical cryptographic operations, such as hash functions or pseudo-random functions (or PRF for pseudo-random function).

This protocol is nevertheless more suitable for the second case with n oblivious transfers since the number of transfers to be executed is less.

In every case, at the end of step 230, the client unit therefore has, for each i from 1 to n and for each datum $Y_{(j)}$ of the server unit, an intermediate datum equal to the evaluation of the sub-function $f_i$ at its datum and the datum of the server unit, multiplied by the corresponding datum $r_{i,(j)}$, which is a masking datum of the intermediate result $f_i(x_i, Y_{(j)})$.

The method also comprises a step 240 in which the server unit carries out, for each datum which it holds, the multiplication of the set of all the reciprocals $r_i^{-1}$ of the data $r_i$ corresponding to the datum Y, and multiplied by the evaluation of the sub-function of the second variable at its datum $f_Y(Y)$. Advantageously, this is first achieved by multiplying all the data $r_i$ and then taking the reciprocal of the result of this product and multiplying it by evaluating the sub-function $f_Y(Y)$, since this reduces the number of inversion operations. If it has only a single datum Y it obtains a result R such that:

$$R = f_Y(Y) \times \prod_{i=1}^{n} r_i^{-1}$$

If it has several data $Y_j$, then it obtains as many $R_j$ respectively written as:

$$R_j = f_{Y_j}(Y_j) \times \prod_{i=1}^{n} r_{i,j}^{-1}$$

This step may occur at any time after the step 210, but not necessarily after the step 230.

The method then comprises a step 250 wherein the client unit performs the multiplication of all the intermediate data $t_i$, and also multiplies them by evaluating the sub-function of the first variable in its datum $f_X(X)$. It obtains a result T such that:

$$T = f_X(X) \times \prod_{i=1}^{n} t_i$$

In order that one of the portions obtains the final result F(X,Y), it obtains from the other portion its result, during an optional step 260. For example the client unit may receive all the results $R_{(j)}$ of the server unit and calculate for each datum $Y_{(j)}$, the product of T and $R_{(j)}$ which gives:

$$T \times R_{(j)} = f_X(X) \times f_{Y_j}(Y_j) \times \prod_{i=1}^{n} f_i(x_i, Y_{(j)}) = F(X, Y_{(j)})$$

Alternatively, the client unit may communicate its result R to the server unit. The server unit then calculates for each datum $Y_{(j)}$, the product of T and $R_{(j)}$ which gives the same result F(X,Y).

The result F(X,Y) may then be used by one of the portions, advantageously in a cryptographic application 300 (for example signature, ciphering, etc.).

Returning to the application of classification of data, the calculation step 200 described herein before is applied with as a function F the kernel of the classifier H or a portion of the latter, for which each sub-function $f_i$ may comprise an exponential term. The classifier H therefore comprises a sum of functions $F_j$ which all have to be evaluated in a secured way.

In the example when the kernel of the classifier is a Gaussian kernel, the classifier is written as:

$$H(X') = \sum_{j=1}^{N} h_j(X') = \sum_{j=1}^{N} F_j(X', Y_j) = \sum_{j=1}^{N} \alpha_j e^{-\gamma_j \|X' - Y_j\|_2^2}$$

and the function F is the kernel of the classifier. A set of functions $F_j = h_j$ written as therefore has to be calculated:

$$F_j(X', Y_j) = \alpha_j e^{-\gamma_j \|X' - Y_j\|_2^2}$$

the parameters held by the server unit being the $Y_j$, the $\alpha_j$ and the $\gamma_j$, thus during step 220 of the method 200, each function $f_{i,j}$ is evaluated in $Y_j$, but also in $\alpha_j$ and $\gamma_j$.

Then, for each function F (the indices j are omitted for more clarity), the sub-function of the first variable is a constant function equal to 1 such that $f_X(X) = 1$.

The sub-function of the second variable is defined by:

$$F_Y(Y) = \alpha e^{-\gamma \|Y\|_2^2}$$

Finally, the sub-functions $f_i(x_i, Y)$ of two variables evaluated in $x_i$ and in the parameters of the server unit are defined as follows:

$$\forall (i,j) \in [1, K] \times [1, l],\ f_{(i-1)l+j}(x_{(i-1)l+j}, Y) = \text{quant}\left(e^{\gamma 2^j x_{(i-1)l+j} Y_i}\right)$$

$$\forall i \in [1, p],\ f_{Kl+i}(x_{Kl+i}, Y) = \text{quant}\left(e^{\gamma 2^{i-1} x_{Kl+i}}\right)$$

The function quant(x) is an entire quantification function of the element x. This for example may be the closest rounded integer. In order to obtain a more accurate result, it is possible to multiply the quantified term by a scale factor a>1; the greater a and the lower is the loss of information at the quant function.

It is possible to summarize the sub-functions $f_i$ in the following way:

$$\forall (i,j) \in [1, K] \times [1, l],\ f_{(i-1)l+j}(x_{(i-1)l+j}, Y) = \text{quant}\left(ae^{\gamma 2^j x_{(i-1)l+j} Y_i}\right)$$

$$\forall i \in [1, p],\ f_{Kl+i}(x_{Kl+i}, Y) = \text{quant}\left(ae^{\gamma 2^{i-1} x_{Kl+i}}\right)$$

Wherein a is greater (effective scale factor) or equal (no scale factor) to 1. The sub-functions $f_{Kl+i}$ give the possibility of calculating the term $\alpha e^{-\gamma \|X\|_2^2}$.

In the example when the kernel of the classifier is a hyperbolic tangent kernel, the classifier H is written as:

$$H(X) = \sum_{j=1}^{N} h_j(X)$$

$$= \sum_{j=1}^{N} F(X', Y_j)$$

$$= \sum_{j=1}^{N} \tanh(\kappa_k \langle X | Y_k \rangle + C_k)$$

$$= \sum_{j=1}^{N} [\exp(2(\kappa_k < X \mid Y_k > + C_k)) - 1] / [\exp(2(\kappa_k < X \mid Y_k > + C_k)) + 1]$$

And each function $F_j$ is the exponential term of the kernel $h_j$ of the classifier depending on the datum X and on the parameters of the classifier, and is written as follows:

$$F_j(X,Y_j) = \exp[2(\kappa_j \langle X|Y \rangle + C)].$$

The parameters held by the server unit are the $Y_j$, $\kappa_j$ and $C_j$, for any j from 1 to N, and therefore during step 220 of the method, each function $f_{i,j}$ is evaluated in $Y_j$, $\kappa_j$ and $C_j$.

Then, for each function F (the indices j are further omitted), the sub-function of the first variable is still a constant function equal to 1, $f_X(X)=1$.

The sub-function of the second variable is defined by $f_Y(Y)=e^{2C}$

The sub-functions $f_i(X,Y)$ of two variables evaluated in X' and in the parameters of the server unit are defined as follows:

$$\forall (i,j) \in [1,K] \times [1,l], f_{(i-1)l+j}(x_{(i-1)l+j}, Y) = \text{quant}(\alpha \cdot e^{\kappa 2^j x_{(i-1)l+j} Y_j})$$

As earlier, quant(x) is an entire classification function of x and a is a scale factor, with a selected to be greater than or equal to 1, and in particular strictly greater than 1 for obtaining an improvement in the accuracy of the result of the quantification function.

Once the function $F_j$ is calculated for each j from 1 to N, the calculation of $h_j$ is easily inferred from the formula given herein before.

In the context of classification, with reference to FIG. 2b, the method 200 is iterated on each of the functions $F_j$, preferably by applying n oblivious transfers on inputs of Nm bits as described herein before, so that the client unit recovers for each kernel function $h_j$, j from 1 to N, a corresponding result $T_j$, and the server unit recovers for a corresponding $R_j$, the $T_j$ and $R_j$ being such that $T_j \times R_j = F_j(X)$ mod m.

The step 260 for calculating the result is not applied so that no portion has any intermediate result before the result of the classification of the datum X.

On the other hand, the classification method then comprises a step 300 for using the results, comprising:
  a secured evaluation of the result of the classifier $H(X) = \Sigma_{j=1}^{N} h_j(X)$,
  and the comparison of the result of the classifier H(X) relatively to a threshold b. In other words, this step 300 comprises the secured calculation, from values of $T_j$ and $R_j$, of H(X), and its comparison of H(X) with the threshold b.

This step is applied by means of a Boolean circuit to be evaluated by multiparty secured calculation between the client unit holding the inputs $(T_1, \ldots T_N)$ and the server unit holding the inputs $(R_1, \ldots R_N, b)$, so that the client unit exclusively obtains the result of the comparison of H(X) with b and the server unit is not aware of any information on X or on the $T_j$.

This step may for example be applied by using the Yao protocol or the Goldreich-Micali-Wigderson protocol (GMW), which are known to one skilled in the art and recalled in the publication of T. Schneider et al., "GMW vs. Yao? Efficient Secure Two-Party Computation with Low Depth Circuits", in *Financial Cryptography and Data Security*, Volume 7859 of the series *Lecture Notes in Computer Science*, pp 275292, 2013.

The Yao protocol was initially introduced in the publication of A. C. Yao et al., "How to generate and exchange secrets", In *Foundations of Computer Science (FOCS'86)*, pp. 162-167, IEEE 1986. The GMW protocol itself was introduced in the publication of O. Goldreich et al., "How to play any mental game or a completeness theorem for protocols with honest majority", In *Symposium on Theory of Computing (STOC'87)*, pp 218-229, ACM (1987).

In the case when the kernel $h_j$ of the classifier is a Gaussian kernel, the Boolean circuit to be evaluated is such that:

$$H(X) = \begin{cases} 1 \text{ if } \sum_{j=1}^{N}((R_j \times T_j) \bmod m) < b \\ 0 \text{ otherwise} \end{cases}$$

In the case when the kernel is a hyperbolic tangent kernel, a first Boolean circuit to be evaluated for obtaining the result of the classifier H(X) is such that:

$$H(X) = \begin{cases} 1 \text{ si } \sum_{j=1}^{N} \frac{Z_j - 1}{Z_j + 1} < b \text{ with } Z_j = (R_j \times T_j) \bmod m \\ 0 \text{ otherwise} \end{cases}$$

This calculation is quite expensive when it is implemented in a Boolean circuit, because of the division. An alternative of a Boolean circuit to be evaluated without any division, and proposing a reduced implementation time, is such that:

$$H(X) = \begin{cases} 1 \text{ if } \sum_{j=1}^{N}\left[(Z_j - 1)\left(\prod_{k \in [1,N] \setminus j}(Z_k + 1)\right)\right] < b \cdot \prod_{j=1}^{N}(Z_j + 1) \\ 0 \text{ otherwise} \end{cases}$$

The method proposed therefore gives the possibility of classifying data in a secured way without any leak of information on the intermediate results $T_j$, $R_j$ while retaining good accuracy on the result.

The invention claimed is:

1. A method for executing a cryptographic calculation applied by a first processing unit, called client unit having a first datum (X') comprising a number n of indexed components and a second processing unit, called server unit, having at least one second datum (Y), each of the client unit and the server unit comprising processing means, the method comprising a secured evaluation of a function (F) of two variables being written as a product of:
  a sub-function $f_X$ of a first variable
  a sub-function $f_Y$ of a second variable, and
  a product of n indexed sub-functions $f_1 \ldots f_n$ of two variables, the secured evaluation of the function (F) being applied with the first datum (X') and the second datum (Y) as inputs of the function (F), the method comprising the following steps:
randomly generating, by the server unit, a set of n indexed data $r_i$ belonging to the set $\mathbb{Z}_m$ with m being a prime number, wherein the indexed data $r_i$ are invertible,
generating, by the server unit, for each i from 1 to n, a set for which each element is formed by a product of an indexed datum $r_i$ with a result of the indexed sub-function of two variables $f_i$ evaluated at the first datum (X') and the second datum (Y),
applying an oblivious transfer protocol between the client unit and the server unit so that the client unit recovers, for each i from 1 to n, an intermediate datum $t_i$ equal to a result of the indexed sub-function of two variables $f_i$ evaluated at the first datum (X') and the second datum (Y), multiplied by the indexed datum $r_i$:

$$t_i = r_i \times f_i(x_i, Y)$$

multiplying, by the client unit, all the intermediate data and the sub-function $f_X$ of the first variable evaluated in the first datum (X') in order to obtain a result T:

$$T = f_X(X') \times \prod_{i=1}^{n} t_i$$

generating, by the server unit, a result R equal to a product of all reciprocals of the indexed data $r_i$ and of the sub-function $f_Y$ of the second variable evaluated in the second datum (Y):

$$R = f_Y(Y) \times \prod_{i=1}^{n} r_i^{-1}$$

using the results T and R in a digital cryptographic application in one of the client unit and the server unit.

2. The method according to claim 1, further comprising communicating by the client unit the result T to the server unit, and the server unit calculates a result of a function (F) by multiplying the result T with the result R.

3. The method according to claim 1, further comprising communicating by the server unit the result R to the client unit, and calculating by the client unit a result of a function (F) by multiplying the result T with the result R.

4. The method according to claim 1, wherein the server unit has a number N of data $Y_1, \ldots Y_N$, and the first datum (X') possessed by the client unit is expressed in base q, wherein q is a positive integer strictly greater than 1, the first datum (X') comprising components with values between 0 and q−1, and the method comprises the secured evaluation of the function (F) between the first datum (X') of the client unit and respectively each datum of the server unit, and
during step a), randomly generating by the server unit a number N·n of indexed invertible data $r_{i,j}$,
during step b), generating by the server unit:
either, for each datum $Y_j$ which the server unit has, and for each i from 1 to n and for each j from 1 to N, a q-uplet for which each element is formed by a product of an indexed datum $r_{i,j}$ with a result of the indexed sub-function of two variables $f_i$ evaluated in the first datum (X') and the second datum (Y):

$$(r_{i,j} \times f_i(0, Y_j), \ldots, r_{i,j} \times f_i(q-1, Y_j))$$

or, for each i from 1 to n, a q-uplet for which each element is a concatenation of products of an indexed datum $r_{i,j}$ with a secured evaluation of the indexed sub-function of two variables $f_i$ at an element from among the set of integers from 0 to q−1 and each of the N data of the server unit:

$$(r_{i,1} \times f_i(0, Y_1) \| \ldots \| r_{i,N} \times f_i(0, Y_N), \ldots, r_{i,1} \times f_i(q-1, Y_1) \| \ldots \| r_{i,N} \times f_i(q-1, Y_N))$$

during step c), respectively applying by the client unit:
either a number N·n of oblivious transfers of type 1 from among q with inputs of the server unit coded on m bits,
or a number n of oblivious transfers of type 1 from among q with inputs of the server unit coded on N·m bits.

5. The method according to claim 1, wherein the first datum (X') of the client unit and the second datum (Y) of the server unit are data representative of physical objects or of physical quantities obtained from a sensor or from an interface.

6. The method according to claim 1, wherein the function (F) of two variables is at least one portion of a kernel of a support vector machine.

7. A method for classifying a datum possessed by a client unit by evaluating a classifier H of a support vector machine in said datum applied together between the client unit and a server unit having parameters of the classifier H,
wherein the method comprises:
performing an evaluation of at least one portion of a kernel of the classifier H in the datum possessed by the client unit applied according to the method in accordance with claim 1, and
performing an evaluation of the classifier H in the datum possessed by the client unit from the evaluation of said at least one portion of the kernel of the classifier H, by multiparty secured calculation between the client unit and the server unit.

8. The method for classifying according to claim 7, comprising quantifying the datum possessed by the client unit, and wherein the step of performing an evaluation of at least one portion of the kernel of the classifier H is applied on an entire quantification of the kernel of the classifier H.

9. The method for classifying according to claim 8, wherein the step of performing an evaluation of at least one portion of the kernel of the classifier H is applied on an entire quantification of the kernel of the classifier H multiplied by a scale factor.

10. The method for classifying according to claim 7, wherein the kernel of the classifier H is a kernel with a Gaussian radial basis h of the form:

$$h(X, Y) = \alpha e^{-\gamma \|X - Y\|_2^2}$$

and the datum possessed by the client unit comprises K floating components $(X_1, \ldots X_K)$, and the method for classifying further comprising:
generating from the datum possessed by the client unit, a datum $(X' = (x_1, \ldots x_{n+p}))$ in base q, and for which:
the n first components correspond to quantifications of K components of the datum possessed by the client unit, and verifying:

$$X_i \approx \sum_{j=1}^{l} q^{j-1} x_{(i-1)l+j}$$

wherein n=K*l, $X_i$ is a component of the datum possessed by the client unit and $x_i$ is a component of the datum (X') in q basis, the $n+1^{th}$ to $n+p^{th}$ components correspond to quantifications of a quadratic norm of the datum possessed by the client unit, $\|X\|_2^2$, such that:

$$\|X\|_2^2 \approx \sum_{i=1}^{p} q^{i-1} x_{n+i}$$

evaluating the kernel, by calculating a function F written as a product of:
 a sub-function $f_X$ of the datum X' of the client unit such that $f_X(X)=1$, wherein X is the datum possessed by the client unit,
 a sub-function $f_Y$ of a second datum Y possessed by the server unit such that $f_Y(Y)=\alpha e^{-\gamma\|Y\|_2^2}$
 a product of n indexed sub-functions $f_i$ of two variables, such that:

$$\forall (i,j) \in [1,K] \times [1,l], f_{(i-1)l+j}(x_{(i-1)l+j}, Y) = \text{quant}\left(ae^{\gamma 2^j x_{(i-1)l+j} Y_i}\right)$$

$$\forall i \in [1,p], f_{Kl+i}(x_{Kl+i}, Y) = \text{quant}\left(ae^{\gamma 2^{i-1} x_{Kl+i}}\right)$$

wherein quant is an entire quantification function and a is a scale factor greater than or equal to 1.

11. The method for classifying according to claim 7, wherein the kernel of the classifier is a hyperbolic tangent kernel h of the form:

$$h(X,Y) = \tan h(\kappa(X|Y)+C)$$

and the datum possessed by the client unit comprises K floating components $(X_1, \ldots X_K)$, and the method for classifying further comprising:
 generating, from the datum possessed by the client unit, a datum (X') in base q, the components of which correspond to the quantifications of K components of the datum possessed by the client unit, and verifying:

$$X_i \approx \sum_{j=1}^{l} q^{j-1} x_{(i-1)l+j}$$

wherein n=K*l, $X_i$ is a component of the datum (X) and $x_i$ is a component of the datum (X') in the q basis,
evaluating from a portion of the kernel of the form $\exp(2(\kappa<X|Y>+C))$, by calculating a function F written as a product of:
 a sub-function $f_X$ of the datum (X') in base q of the client unit such that $fx(X')=1$
 a sub-function $f_Y$ of a second datum (Y) possessed by the server unit such that $f_Y(Y)=e^{2C}$
 a product of n indexed sub-functions $f_i$ of two variables, such that:

$$\forall (i,j) \in [1,K] \times [1,l], f_{(i-1)l+j}(x_{(i-1)l+j}, Y) = \text{quant}(\alpha \cdot e^{\kappa 2^j x_{(i-1)l+j} Y_i})$$

wherein quant is an entire quantification function and a is a scale factor greater than or equal to 1.

12. A computer program product stored on a non-transitory computer readable medium, comprising code instructions for executing, by a processor of a processing unit, called server unit, a method comprising a secured evaluation of a function (F) of two variables written as a product of:
 a sub-function $f_X$ of a first variable
 a sub-function $f_Y$ of a second variable, and
 a product of n indexed sub-functions $f_1 \ldots f_n$ of two variables,
the secured evaluation of the function (F) being applied with at least one first datum (X') possessed by a client unit and a second datum (Y) possessed by the server unit as inputs for the function (F),
wherein the method comprises the following steps:
 randomly generating a set of n indexed data $r_i$ belonging to the set $\mathbb{Z}_m$ with m being a prime number, wherein the indexed data $r_i$ are invertible,
 generating, for each i from 1 to n, a set for which each element is formed by a product of an indexed datum $r_i$ with a result of the indexed sub-function of two variables $f_i$ evaluated at the first datum (X') and the second datum (Y),
 participating in an oblivious transfer protocol with the client unit so that the client unit recovers, for each i from 1 to n, an intermediate datum $t_i$ equal to a result of the indexed sub-function of two variables $f_i$ evaluated in the first datum (X') and the second datum (Y), multiplied by the indexed datum $r_i$:

$$t_i = r_i \times f_i(x_i, Y)$$

wherein the client unit multiplies all the intermediate data and the sub-function fX of the first variable evaluated at the first datum (X') in order to obtain a result T:

$$T = f_X(X') \times \prod_{i=1}^{n} t_i$$

generating a result R equal to a product of all reciprocals of the indexed data $r_i$ and of the sub-function $f_Y$ of the second variable evaluated in the second datum (Y):

$$R = f_Y(Y) \times \prod_{i=1}^{n} r_i^{-1}$$

using the results T and R in a digital cryptographic application in the server unit.

13. A data processing system comprising a first processing unit called client unit having a first datum (X') comprising a number n of indexed components, and a second processing unit, called server unit, having at least one second datum (Y), each of the client unit and the server unit comprising a memory, each of the first processing unit and the second processing unit comprising a processor and a communication interface, wherein the client unit and the server unit are configured to execute a cryptographic calculation comprising a secured evaluation of a function (F) of two variables being written as a product of:
 a sub-function $f_X$ of a first variable
 a sub-function $f_Y$ of a second variable, and
 a product of n indexed sub-functions $f_1 \ldots f_n$ of two variables,
 the secured evaluation of the function (F) being applied with the first datum (X') and the second datum (Y) as inputs of the function (F), wherein the cryptographic calculation comprises the following steps:
randomly generating, by the server unit, a set of n indexed data $r_1$ belonging to the set $\mathbb{Z}_m$ with m being a prime number, wherein the indexed data $r_i$ are invertible,
generating, by the server unit, for each i from 1 to n, a set for which each element is formed by a product of an indexed datum $r_i$ with a result of the indexed sub-function of two variables $f_i$ evaluated at the first datum (X') and the second datum (Y),
applying an oblivious transfer protocol between the client unit and the server unit so that the client unit recovers, for each i from 1 to n, an intermediate datum $t_1$ equal to a result of the indexed sub-function of two variables $f_i$ evaluated at the first datum (X') and the second datum (Y), multiplied by the indexed datum $$t_i = r_i \times f_i(x_i, Y)$$

multiplying, by the client unit, all the intermediate data and the sub-function $f_X$ of the first variable evaluated in the first datum (X') in order to obtain a result T:

$$T = f_X(X') \times \Pi_{i=1}^n t_i$$

generating, by the server unit, a result R equal to a product of all reciprocals of the indexed data $r_i$ and of the sub-function $f_Y$ of the second variable evaluated in the second datum (Y):

$$R = f_Y(Y) \times \Pi_{i=1}^n r_i^{-1}$$

using the results T and R in a digital cryptographic application in one of the client unit and the server unit.

14. The data processing system according to claim 13, wherein the first processing unit and the second processing unit are further configured to apply a method for classifying a datum possessed by the client unit by evaluating a classifier H of a support vector machine in said datum applied together between the client unit and the server unit having parameters of the classifier H,
wherein the method comprises:
performing an evaluation of at least one portion of a kernel of the classifier H in the datum possessed by the client by means of the cryptographic calculation, and
performing an evaluation of the classifier H in the datum possessed by the client unit from the evaluation of said at least one portion of the kernel of the classifier H, by multiparty secured calculation between the client unit and the server unit.

\* \* \* \* \*